Dec. 2, 1924.
J. R. LOWREY
1,517,242
HOSE COUPLING
Filed May 24, 1923
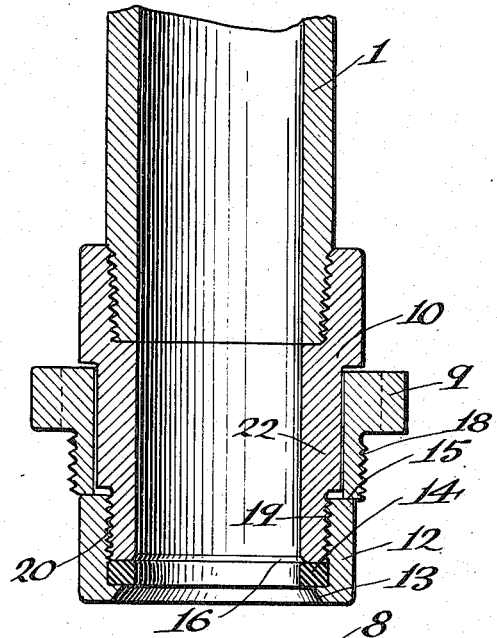
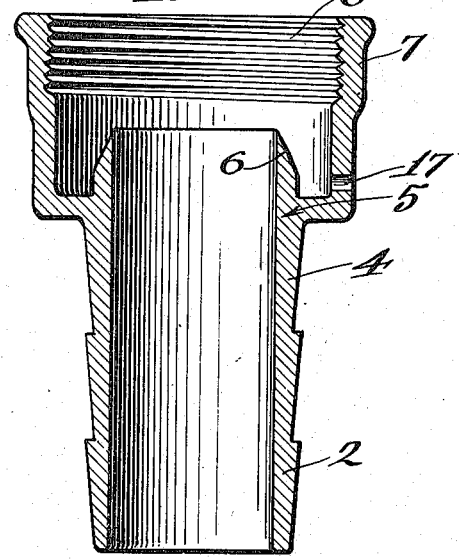
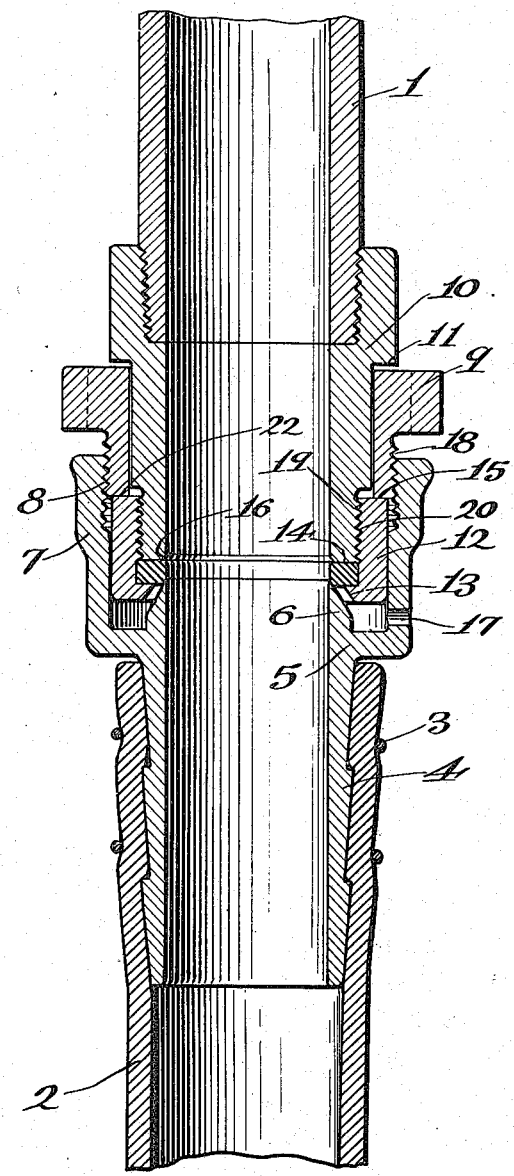
Witness.
W. H. Hall
Inventor.
John R. Lowrey
By Hazard and Miller
Attorneys Patented Dec. 2, 1924.

1,517,242

UNITED STATES PATENT OFFICE.

JOHN R. LOWREY, OF LOS ANGELES, CALIFORNIA.

HOSE COUPLING.

Application filed May 24, 1923. Serial No. 641,108.

*To all whom it may concern:*

Be it known that I, JOHN R. LOWREY, a citizen of the United States, residing at Los Angeles, in the county of Los Angeles and State of California, have invented new and useful Improvements in Hose Couplings, of which the following is a specification.

My present invention is a coupling especially adapted to connect a hose with a valved or other outlet; but it should be understood that my coupling may be used also to connect a plurality of sections of hose or a plurality of sections of rigid pipe, it being a special object of this invention to provide a simple and effective coupling adapted securely to retain a gasket and to facilitate the making of a very tight joint suitable for use in, for example, the outlet from an oil tank, such as a gasoline tank.

It is an object of this invention to provide a coupling all of whose parts are secured against loss and protected against accidental damage, and which may be connected or disconnected by the mere rotation of a collar and without requiring a rotation of either the movable coupling element which may be connected with a hose or the fixed coupling element which may be secured to a valved outlet.

It is a further object of this invention to provide a coupling comprisng a gasket retaining ring which may be secured by a threaded engagement with associated parts and may serve also to secure a rotatable locking collar; and, in a preferred form of my invention, the mentioned locking ring may be provided with an inwardly tapered surf ce which may, under certain circumstances, c ntact with an interfitting surface upon the cooperating element of a coupling, to produce a tight joint.

It is a further object of this invention to provide a coupling comprising a female coupling element, which may be fixed, carrying a fixed gasket and a rotatable collar and comprising also a male coupling element comprising a spherical or conical surface, which may be a turned or ground surface, projecting from the bottom of a guard cup, this guard cup being preferably provided with an internal thread adapted to cooperate with an external thread on said locking collar; and, in a preferred form of my invention, the mentioned spherical or conical surface may be adapted to cooperate alternatively either with the edge of the mentioned gasket, to force the same into tight contact with both the threaded retaining ring and the body of the female element of my coupling, or with a corresponding ground surface upon said threaded ring; and, in order to avoid a splashing or loss of oil, or the like, when my coupling is disconnected from a valved outlet, the mentioned guard cup may optionally be provided with a port through which air may be permitted to enter during the uncoupling of a hose, which may be filled with oil, and before such hose shall be completely uncoupled.

Broadly, it is an object of this invention to provide a coupling, either element of which may be rigidly connected to a valved outlet and which may permit of a swiveling connection between such outlet and a hose, although also permitting such hose to be connected or disconnected by the mere rotation of a collar.

Other objects of my invention will appear from the following description of a preferred embodiment thereof, and from the appended claims, taken in connection with the accompanying drawings, in which—

Fig. 1 is a vertical section, showing the elements of my coupling as disconnected.

Fig. 2 is a similar view, showing the elements of my coupling as connected.

Referring in detail to the parts of that specific embodiment of my invention which I have chosen for purposes of illustration, 1 may be regarded as the end of a fixed pipe, which may be a valved outlet pipe; and 2 may be a hose or pipe which is to be connected thereto. Although either the male or the female element of my coupling may obviously be adapted to be secured, as by bands 3, to a coupling element provided with hose-retaining projections 4, I have shown these projections as circumferentially disposed upon a male coupling element 5, which is preferably of a comparatively simple form and may consist essentially of a projecting tapered element 6, shown as surrounded and protected by a guard cup 7, shown as provided with an internal thread 8, adapted to be so engaged by a collar 9 upon the body of the female coupling element 10 as to draw and secure the said male coupling element in the manner best shown in Fig. 2.

Although the female element of my coupling might be variously formed, I have shown this element as comprising not only the mentioned body 10 and the locking collar 9 adapted to contact with a shoulder 11 thereon and to rotate without advancing, in the manner described, but as comprising also an undercut threaded retaining ring 12 provided near its end with an inwardly tapered surface 13 and adapted not only to retain and protect a gasket 14 but also to provide at 15 an additional bearing surface for the locking collar 9.

By the construction shown, it will be obvious that, the gasket 14 being rectangular in cross section and being preferably formed of a material which will not deteriorate in contact with gasoline, or the like, the action of the tapered surface of the projection 6, upon the tightening of a coupling of the character described, must be to effect a tight joint without requiring a relative rotation between the projection 6 and the gasket 14, the relationship of the parts being such as to press said gasket against the interior of the retaining ring and against the end of the body 10 of the female element of my coupling, and also such that in case of undue wear upon or actual loss of said gasket, the projection 6 may effect a fitting contact with the corresponding tapered surface 13 upon the retaining ring 12 or with a similar tapered surface 16 at the inside of the outer end of the body 10, or with both.

In order to avoid a splashing or loss of oil, or other liquid, when my coupling is used upon a removable delivery hose, air may be permitted to enter during the uncoupling of my device; and, for this purpose, I may provide an air inlet opening 17, this opening preferably extending through the guard cup 7, near the bottom thereof, in such manner as to permit an entrance of air before the external threads 18 upon the locking ring shall be completely disengaged from the internal threads 8 upon said guard cup.

It will be obvious that equivalent engaging means may be substituted for the mentioned threads by which the elements of my coupling are brought into effective contact, and that equivalent means may also be substituted for the exterior threads 19 upon the fixed body 10 and for the interior threads 20 by which the retaining ring 12 is shown as secured thereto; but it is important that the upper surface 15 of the said retaining ring and the lower surface 22 of the locking collar, adapted to rotate thereon, shall be flat and perfect, in order to permit of a swiveling rotation of a hose upon a valved outlet, without incidental disengagement thereof.

Although I have herein described one complete embodiment of my invention, it will be understood that various parts or features thereof might be independently employed, and also that various modifications might be made therein without departure from the spirit and scope of my invention as the same is indicated above and in the following claims.

What I claim is:

1. In a coupling, a female element comprising a body, a gasket at the end thereof, an undercut retaining ring adapted to secure said gasket, and a locking collar adapted to rotate without advancing on said body, said collar being confined between said ring and a shoulder on said body.

2. In a coupling, a female element comprising a body, a gasket at the end thereof, and undercut retaining ring adapted to secure said gasket, said body, said gasket and said ring being adapted to alternatively engage a cooperating surface upon a male coupling element.

3. In a swivel coupling, a female element comprising a body, a gasket at the end thereof, an undercut retaining ring adapted to secure said gasket, a locking collar adapted to rotate on said body, and a male element comprising a tapered projection extending from the bottom of a guard cup adapted to engage said locking collar.

4. In a swivel coupling, a female element comprising a body, a gasket at the end thereof, means on said female element for retaining said gasket, a male element comprising a guard cup and a tapered tubular projection extending from the bottom of said guard cup, adapted to engage said gasket, and a locking collar rotatably mounted on said female element and adapted to be detachably connected to said guard cup, there being a loose fit between the female element in respect to the collar and said guard cup, thereby allowing relative swiveling movement between the male and female elements without unlocking the locking collar.

5. In a swivel coupling, a female element comprising a body, a gasket at the end thereof, means on said body for rotating said gasket, a male element comprising a tapered tubular projection adapted to be engaged by said gasket, a locking collar on said female element, the male element being provided with a guard cup adapted to be detachably secured to said locking collar, said female element having a loose fit in respect to said guard cup and said locking collar, thereby allowing relative swiveling movement between the female and male elements without unlocking the locking collar.

In testimony whereof I have signed my name to this specification.

JOHN R. LOWREY.